INVENTOR
MICHAEL P. ROSEMAN
BY
ATTORNEYS

United States Patent Office 3,512,953
Patented May 19, 1970

3,512,953
GLASS SHEET PRESS SHAPING MOLD WITH
TENSION MEANS FOR SUPPORTING TONGS
Michael P. Roseman, Tyrone, Pa., assignor to PPG Industries, Inc., Pittsburgh, Pa., a corporation of Pennsylvania
Filed Sept. 21, 1967, Ser. No. 669,601
Int. Cl. C03b 23/02
U.S. Cl. 65—287
5 Claims

ABSTRACT OF THE DISCLOSURE

In combination with a mold for press bending glass sheets having a shaping surface and a notch in said shaping surface providing clearance to receive glass gripping tongs, a spring loaded member having a tong facing surface in the notch, means to position said member to locate said tong facing surface a predetermined distance behind said shaping surface and indepedent means to adjust the tension on said spring.

---

This invention relates to shaping glass sheets, and particularly to an improved apparatus for press bending glass sheets into a desired shape.

Glass sheets are fabricated into bent shapes for such uses as curved windows for automobiles, motor boats, and other vehicles, as cover windows for instrument panels and television tubes and many other articles by heating a succession of glass sheets while conveyed through a furnace of tunnel-like configuration, and removing the sheets one at a time when the sheet has attained its deformation temperature to engage the sheet between a pair of opposed shaping members having complementary curvatures conforming to the shape desired for the bent glass sheets. If desired, the bent sheet is tempered by sudden chilling before its temperature is lowered below an elevated temperature suitable for glass tempering immediately following the press bending operation.

Glass sheets are usually gripped near their upper edges by one or more sets of tongs during this thermal treatment incidental to press bending and tempering. The tongs are suspended from carriages which are conveyed along a horizontal path of a conveyor that extends lengthwise through the enclosed furnace and the glass shaping station.

During the heating that softens the glass before it is shaped, the tongs provide a pair of gripping forces opposing one another through the thickness of the glass sheet. Each glass sheet is suspended in a vertical plane from the tongs. Normally, more than one set of tongs is needed to support a flat glass sheet for thermal treatment.

Many devices have been developed to insure that flat glass sheets are propertly suspended, usually from a plurality of sets of tongs. Proper loading reduces the likelihood that each set of tongs will apply a twisting force that distorts the glass and imparts a defect that is known as a kink therein. When a glass sheet is loaded properly, the gripping force applied thereto by each set of tongs is substantially equal to that applied by each other set of tongs.

Each set of tongs exerts a pull in a substantially vertical direction at each glass gripping region gripped by a pair of tongs. When the glass sheet is heat-softened, its low viscosity at elevated temperatures permits the glass to distort in the vicinity of each gripping region and form a convex bump in the convex edge of the supported glass sheet. The effect of this pull is minimized when the portion of glass weight borne by each pair of tongs is minimized. An optimum condition is obtained when the number of tongs used is increased and an equal portion of the glass weight is borne by a pair of tongs. However, the complexity of loading the glass sheet increases with the number of sets of tongs used. Therefore, a compromise is usually made to limit the number of sets of tongs used to the minimum needed to support the weight of the glass sheet treated and obtain an upper edge distortion within acceptable tolerance limits.

When the prior art techniques for gripping a flat glass sheet having a plurality of sets of tongs are employed for press bending and tempering flat glass sheets, the defects due to kinking and pulling are reduced substantially. However, the prior art criteria for suspending flat glass sheets probably are insufficient to avoid kinking and pulling when the flat glass sheets are shaped into curved configurations, particularly when gripped by tongs for shaping about a bending curve having a vertically disposed axis of curvature.

When glass sheets are bent in such a manner, the glass sheet portions are displaced horizontally from the vertical plane occupied by the flat glass. The tongs supporting these portions are rotated out of plumb and tend to kink the softened glass because the tongs tend to rotate beyond the amount required because of intertia and then to return to a vertical suspension while the glass is heat-softened. This causes a dimple in the glass. The present invention provides a yieldable device for limiting the rate of tong displacement from its plumb line to reduce the effect of inertia and to limit the deviation of the tongs from the freely hanging position and hence, limits the force the tongs apply against the heat-softened glass portions they engage that tend to dimple the engaged portions. The improved device of the present invention is provided immediately behind the conventional recesses or notches in the conventional press bending molds that provide clearance to receive the glass gripping tongs when the pressing molds engage the heat-softened sheet.

According to a particular embodiment of the present invention, a spring loaded member having a tong facing surface is located in a notch of a press bending mold toward which the tong tends to pivot. Means is provided so as to locate the tong facing surface a predetermined distance behind the shaping surface of the mold and independent means is provided to adjust the tension on the spring so as to adjust the resistance the spring loaded member applies when engaged by a set of tongs that has moved out of plumb.

The present invention will be understood better from a detailed description of an illustrative embodiment of the present invention that follows.

In the drawings that form part of the description, and wherein like reference numbers refer to like structural elements, FIG. 1 is an exploded, fragmentary view in perspective of a pair of press bending molds in retracted position, showing one mold provided with a tong restricting element according to the present invention;

An illustrative embodiment of glass shaping apparatus using the present invention comprises a concave shaping mold 10 and a convex shaping mold 11. The molds are provided with complementary shaping surfaces adapted to engage a heat-softened glass sheet therebetween to impress a curvature thereon. The particular pattern of glass sheet press bent by the apparatus illustrating the present invention is an automobile backlight that is bent relatively moderately about its longiutdinal axis and relatively sharply about its transverse axis of curvature.

Figure 2:
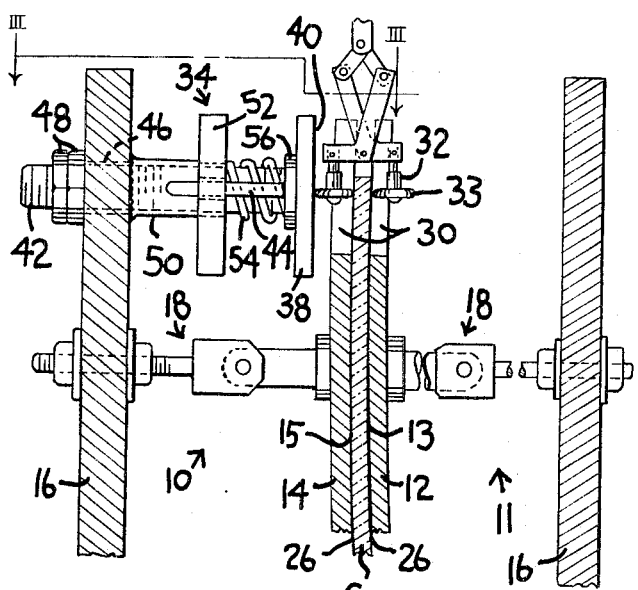
FIG. 2 is a fragmentary sectional view of the press bending molds in glass engaging position, taken along the lines II—II of FIG. 1.
Figure 3:
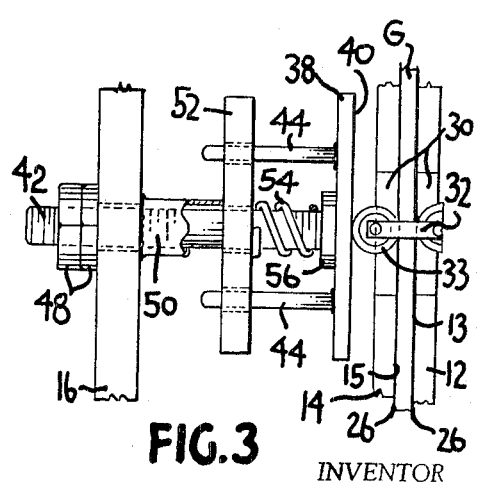
FIG. 3 is a plan view taken along the lines III—III of FIG. 2.

The convex shaping mold comprises a relatively thin, flexible shaping plate 12 having a convex surface 13 (FIG. 2) facing one suface of a glass sheet G. The concave shaping member 10 comprises a relatively thin, flexible shaping plate 14 having a concave shaping surface 15 facing forward and against the opposite surface of the glass sheet. Each shaping mold comprises a relatively rigid reinforcement member in the form of a relatively thick, metal plate 16 disposed in spaced relation behind each relatively thin, relatively flexible shaping plate 12 or 14 by a series of jointed attachment means 18 disposed throughout the extent of the plates and having sufficient looseness at their joints to permit the flexible shaping plate to expand and contract thermally along two axes relative to the rigid reinforcing member 16 to which it is attached in response to periodic changes of temperature encountered in a cemmercial press bending operation. Additional relatively rigid attachment means are centrally disposed to interconnect the central portions of the shaping plates to the central portions of the respective reinforcing members of the shaping molds to insure proper alignment and orientation of the shaping molds relative to one another, as claimed and described in patent application Ser. No. 418,430 of Samuel L. Seymour filed Dec. 15, 1964 for Shaping Glass Sheets.

A rigid back plate 20 is connected in spaced relation behind each rigid reinforcing member 16 by a plurality of elongated connecting members 22. The back plate is attached to a piston assembly (not shown) by suitable connections 23 to a piston plate 24 attached to the forward end of a piston for moving the shaping molds relative to one another in a manner well known in the art.

Each shaping mold is provided with a cover 26 in direct contact with shaping surface 13 or 15. The cover 26 is preferably of a material that does not harm glass at elevated temperatures such as a knit fiber glass cloth composed of textured fibers that have sufficient resiliency and stretchability to conform to curved shaping surface. A superior type of cover for the pressing molds is described and claimed in U.S. Pat. No. 3,148,968 to James H. Cypher and Clement E. Valchar issued Sept. 15, 1964. A number of hand clamps 28 is mounted about the periphery of each relatively rigid reinforcing member 16 to clamp each cover 26 in position where it is in unwrinkled condition over the shaping surface 13 or 15 which it covers. The stretchability of the knit cover permits it to have the capability of further yielding if necessary and yet providing an unwrinkled parting material between each shaping plate 12 or 14 and one of the oppoiste sufraces of the glass sheet.

Each of the relatively thin, flexible, shaping plates 12 and 14 is provided with a series of notches 30, one for each pair of tongs 32 which grip the glass sheet G. The notches 30 oppose one another and are aligned in pairs when the press bending molds 10 and 11 engage a heat-softened glass sheet for bending.

The tongs are preferably of the kind that are provided with freely pivotable glass gripping elements in the form of discs 33. Such tongs are described and claimed in U.S. Pat. No. 3,089,727 to William J. Hay issued May 14, 1963.

Figure 1:
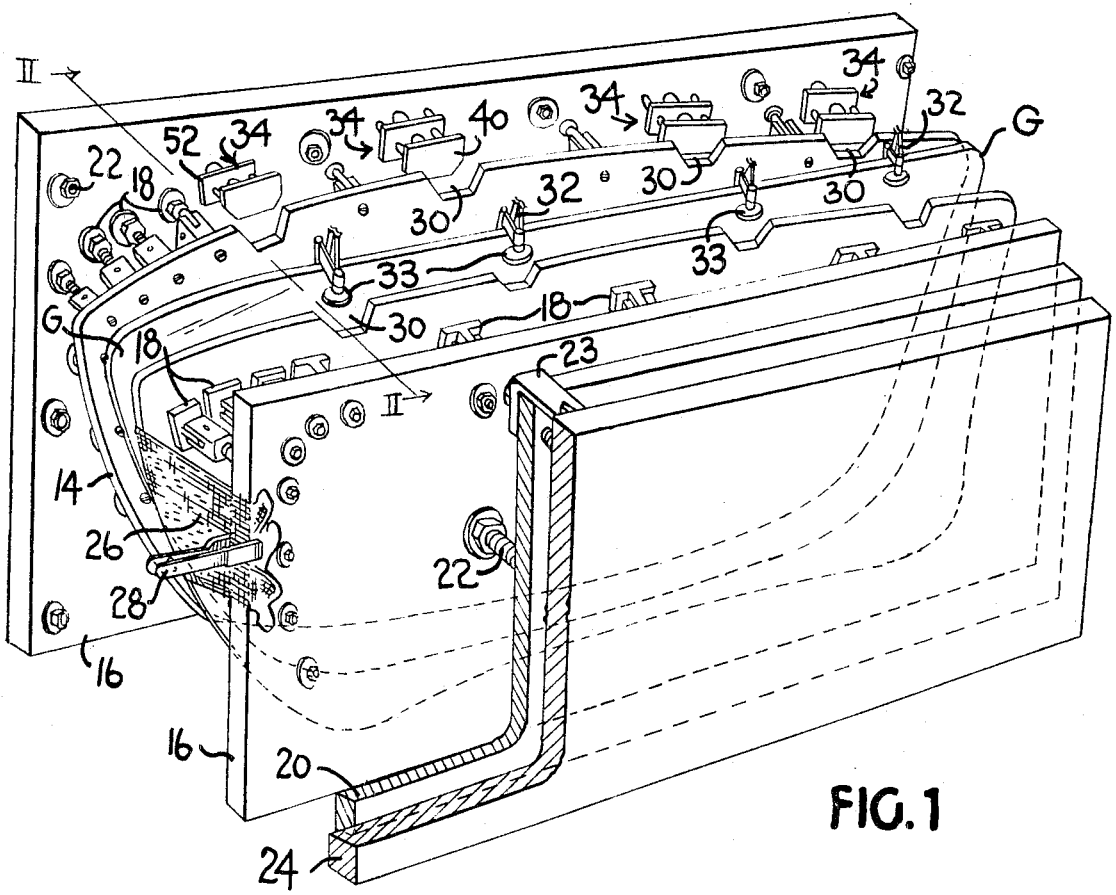

The glass sheet to be bent is shown suspended by four sets of tongs in FIG. 1 along the length of the longest edge of a flat sheet that is to be bent to produce a curved automobile backlight. Such a backlight is bent to a relatively sharp curvature about a vertical axis when the longest edge of the glass sheet treated extends horizontally.

When the pressing molds engage the heat-softened glass sheet, the glass gripping elements 33 at the lower portion of the tongs 32 move as the glass sheet portion attached thereto is displaced horizontally. This displacement causes the tongs to tilt from a free hanging vertical position to an oblique disposition. The amount of tong pivoting is dependent upon how severely the glass sheet portion the tong grips is displaced from its original position as the glass is bent.

The present invention suggests a yieldable tong restrictor 34 behind a selected notch 30 of each pair of aligned notches. A yieldable restrictor properly placed limits the maximum displacement of the tongs from its free-handing, vertical position to one consistent with the depth of glass bend, and provides a yieldable resistance as the set of tongs approaches its maximum required displacement, thereby avoiding over-swinging of the tongs in the direction that the tongs are displaced and consequently reducing the force the set of tongs exerts on the engaged glass portion by tending to return to the free-hanging vertical position.

Each of the tong restrictors 34 must have some yieldability in order to retard the swinging gradually and to minimize damage to the tongs and the glass that would occur if the tongs would contact a solid, unyielding member on pivoting in response to the glass displacement during bending. Accordingly, each tong restrictor 34 is essentially a spring loaded member and comprises a plate 38 having a tong facing surface 40. An externally threaded shaft extends rearward from the center of the plate 38. A pair of guide pins 44 also extend rearward of the plate 38, one on each side of the externally threaded shaft 42.

An aperture 46 is provided in the rigid reinforcing member 16 to receive the inner end of the externally threaded shaft 42. A pair of lock nuts 48 is disposed about the inner end of the threaded shaft 42 behind the rigid reinforcing member 16 to adjust the position of plate 38 relative to each notch 30. Preferably, the plate 38 should be located so that its tong face surface 40 is disposed rearward of the shaping surface 15 of the flexible shaping plate 14 a sufficient distance to enable the tongs 32 to pivot almost the entire distance needed to compensate for the horizontal displacement of the gripped glass sheet portion before contacting the tong facing surface 40.

The threaded shaft 42 and the lock nuts 48 provide means to adjust the position of the tong restrictor 34 within the notch of the concave shaping mold 10 to locate the tong shaping surface 40 a predetermined distance behind the shaping surface 15.

The tong restrictor 34 also comprises a tube 50 aligned with the opening 46 in the rigid reinforcing member 16 and extending forwardly from said opening. An apertured plate 52 is rigidly attached to the forward end of the tube 50 behind the notch 30. Apertures are provided in the apertured plate 52 to receive the threaded shaft 42 and the guide pins 44. A spring 54 is wound around the portion of the threaded shaft 42 between the apertured plate 52 and the rear of plate 38. An adjustment nut 56 is threaded about shaft 42 immediately behind plate 38 and engages the forward end of the spring 54 to adjust the tension in the spring 54.

It is thus seen that the plate 38 of the tong restrictor 34 is a spring loaded member providing yielding engagement when the glass engaging members 33 come into contact with the tong facing surface 40 of the spring loaded plate 38 of the tong restrictor 36. The tension in the spring 54 is adjustable independently of the position adjustment means. The adjustment nut 56 threaded on shaft 42 cooperates with the rigidly secured apertured plate 52 to provide spring tension adjustment means.

While the invention has been disclosed in an environment having adjustable press bending molds, it is understood that solid molds that have notches could be provided with means for adjusting the location of a spring-loaded tong restrictor relative to the rear wall of the notched portion wherein the rear wall of the notched portion is equivalent to the rigid reinforcement plate 16.

While the illustrative embodiment of the present invention has shown tong restrictors behind the notches of one shaping member only for use in molds for shaping backlights that are sharply bent about their transverse axis only near their longitudinal end portions, it is understood that in cases of molds providing sharper bends or more uniform bends that the tong restrictors may be employed with some behind notches in one of the opposed shaping molds and others behind notches in the other shaping mold. In other words, the location of the shaping mold which receives the individual spring-loaded tong restrictor is determined by the direction in which the individual set of tongs pivots as the glass is bent.

An illustrative embodiment of the present invention has been described for the purposes of illustration and various modifications thereof will become obvious in the light of the above description without departing from the spirit of the present invention as defined in the claimed subject matter which follows.

What is claimed is:

1. In combination with a mold for press bending glass sheets having a shaping surface conforming to the shape desired for a glass sheet after bending and complementary to a shaping surface of another mold between which molds a tong-gripped, heat-softened glass sheet is press bent, said shaping surfaces including a pair of aligned notches providing clearance to receive a set of glass gripping tongs when said molds engage a glass sheet during said press bending, a spring loaded member in one of said pair of notches toward which said tongs pivot in response to said press bending, said member having a tong facing surface, means to adjust the position of said member in said notch to locate said tong facing surface a predetermined distance behind said shaping surface and independent means to adjust the tension on said spring.

2. In the combination as in claim 1, comprising a threaded shaft, said recess including a first plate having an opening for receiving the rear portion of said threaded shaft, a pair of guide pins extending rearward from said tong facing member, an apertured plate secured in spaced relation forward of said first plate and behind said tong facing member and having an aperture to receive siad shaft and additional apertures, one for each of said guide pins, a spring disposed about said shaft between said tong facing member and said apertured plate, and said means for adjusting the tension on said spring comprising an adjustment nut threaded about the forward end of said threaded shaft between the rear surface of said spring-loaded member and the forward end of said spring.

3. In the combination as in claim 2, further including means to secure said apertured plate in said spaced relation forward of said first plate, said means comprising a tube aligned with said opening in said first plate and said aperture in said apertured plate for said threaded shaft, said tube extending from the rear of said apertured plate to said first plate and being rigidly connected at its ends to said apertured plate and said first plate.

4. In the combination as in claim 1, wherein each of said molds is provided with a plurality of notches aligned with notches in the other mold to form spaced pairs of aligned notches, and each of the notches in one of said molds contains one of said spring-loaded members provided with said position adjustment means and said spring tension adjustment means.

5. In the combination as in claim 1, wherein each of said molds is provided with a plurality of notches in the other mold to form spaced pairs of aligned notches, and certain notches of certain pairs of notches of one of said molds and the notches of the other pairs of notches of the other of said molds each contain one of said spring-loaded members provided with one of said position adjustment means and one of said spring tension adjustment means.

References Cited

UNITED STATES PATENTS 3,389,984   6/1968   Englehart et al. ____ 65—273 X

ARTHUR D. KELLOGG, Primary Examiner

U.S. Cl. X.R.

65—273, 275